(12) United States Patent
Sanchez et al.

(10) Patent No.: US 7,044,018 B2
(45) Date of Patent: May 16, 2006

(54) CONNECTING ELEMENT

(75) Inventors: Manuel Martin Sanchez, Rubi (ES); Juan M. Dona Contero, Rubi (ES)

(73) Assignee: Fico Cables S.A., Rubi (Barcelona) (ES)

( * ) Notice: Subject to any disclaimer, the term of this patent is extended or adjusted under 35 U.S.C. 154(b) by 0 days.

(21) Appl. No.: 10/926,257

(22) Filed: Aug. 25, 2004

(65) Prior Publication Data

US 2005/0016317 A1    Jan. 27, 2005

Related U.S. Application Data

(63) Continuation of application No. 09/980,537, filed on Feb. 26, 2002, now abandoned.

(30) Foreign Application Priority Data

Apr. 26, 1999   (DE) ................. 199 18 911

(51) Int. Cl.
*F16C 1/14* (2006.01)

(52) U.S. Cl. ................. 74/502.4; 403/135
(58) Field of Classification Search ............. 74/502.4, 74/502.6; 439/357, 358; 403/122, 132, 403/133, 135, 137, 321, 326, 327
See application file for complete search history.

(56) References Cited

U.S. PATENT DOCUMENTS

| | | | |
|---|---|---|---|
| 4,581,953 A * | 4/1986 | Walston et al. ............. 74/502.4 |
| 5,220,832 A | 6/1993 | Petruccello ................. 74/502.4 |
| 5,265,495 A | 11/1993 | Bung et al. ................. 74/502.6 |
| 5,398,566 A | 3/1995 | Moore ....................... 74/502.4 |
| 5,584,212 A | 12/1996 | Wild ......................... 74/502.6 |
| 5,676,485 A | 10/1997 | Lee ............................. 403/135 |
| 5,682,797 A | 11/1997 | Kelley et al. .............. 74/502.4 |
| 5,685,199 A | 11/1997 | Malone ..................... 74/502.4 |
| 5,709,132 A | 1/1998 | Irish et al. ................. 74/502.4 |
| 5,749,746 A | 5/1998 | Tan et al. ................... 439/357 |
| 5,937,705 A | 8/1999 | Corbett et al. ......... 74/501.5 R |
| 6,099,339 A | 8/2000 | Yanagida et al. ........... 439/358 |
| 6,109,132 A | 8/2000 | Frye ........................... 74/502.4 |

FOREIGN PATENT DOCUMENTS

| | | |
|---|---|---|
| DE | 44 28 496 | 2/1996 |
| DE | 198 13 721 | 3/1998 |

(Continued)

*Primary Examiner*—Chong H. Kim
(74) *Attorney, Agent, or Firm*—Renner, Otto, Boisselle & Sklar, LLP

(57) ABSTRACT

The invention relates to a connecting element for the releasable connection of a first part with a second part, in particular a bowden cable with a lever wherein the connecting element comprises a housing which is rigidly mounted to the first part, an engaging element mounted to the second part and a slide having a receiving element complementary shaped to the engaging element for the releasable connection of the engaging element with the receiving element. The slide can inside the housing slide from a first position into a second position for latching the releasable connection between the engaging element and the receiving element. The connecting element further comprises at least one latching means for fixing the slide in the second position and at least one releasing means for manually acting onto the at least one latching means in order to release the slide from the second position for the unlatching of the releasable connection between the engaging element and the receiving element.

13 Claims, 3 Drawing Sheets

FOREIGN PATENT DOCUMENTS

Figure 1:
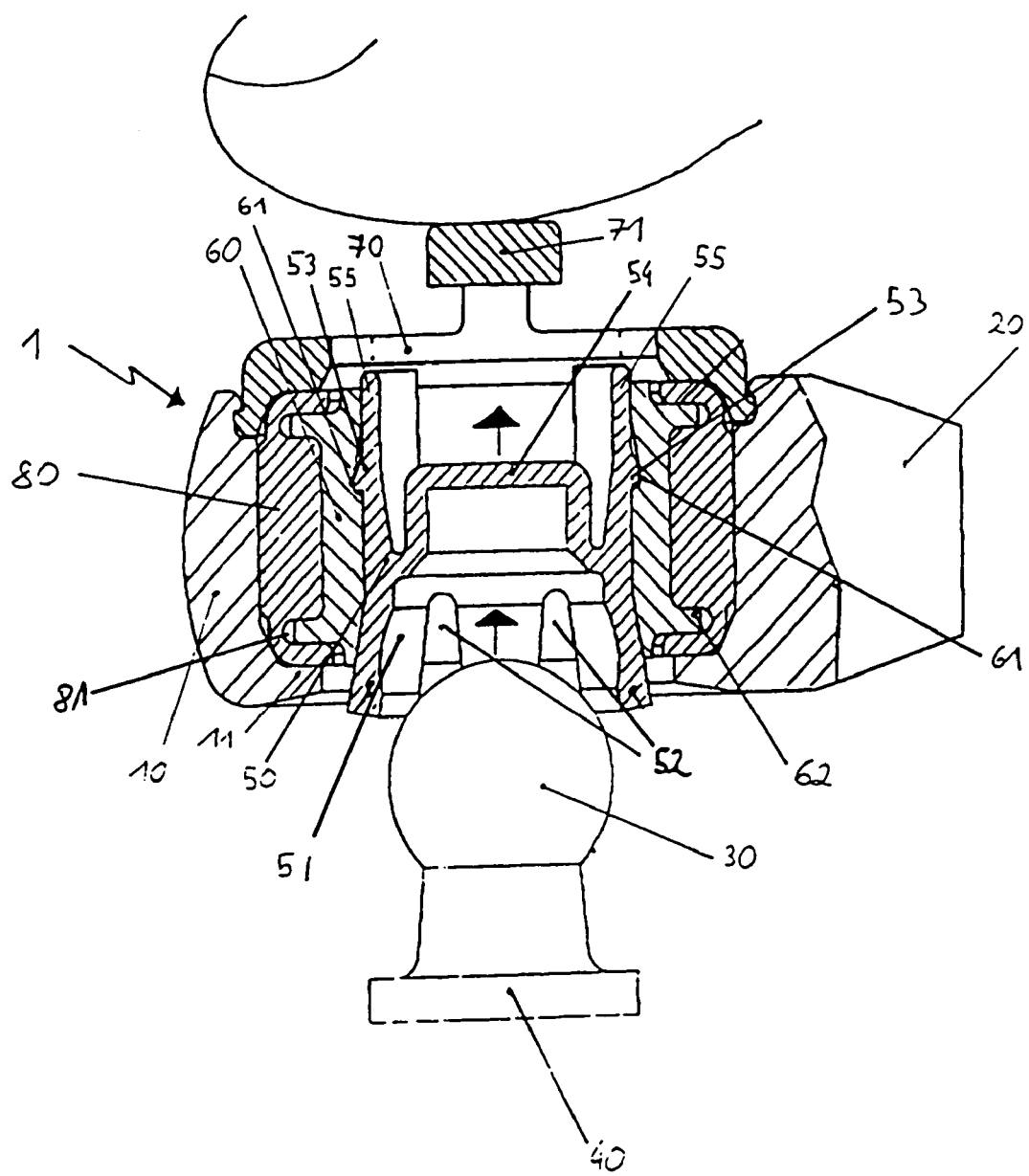

| | | |
|---|---|---|
| DE | 298 04 345 | 5/1998 |
| DE | 198 24 530 | 12/1998 |
| DE | 199 18 911 | 4/1999 |
| EP | 200793 A1 * | 11/1986 |

* cited by examiner

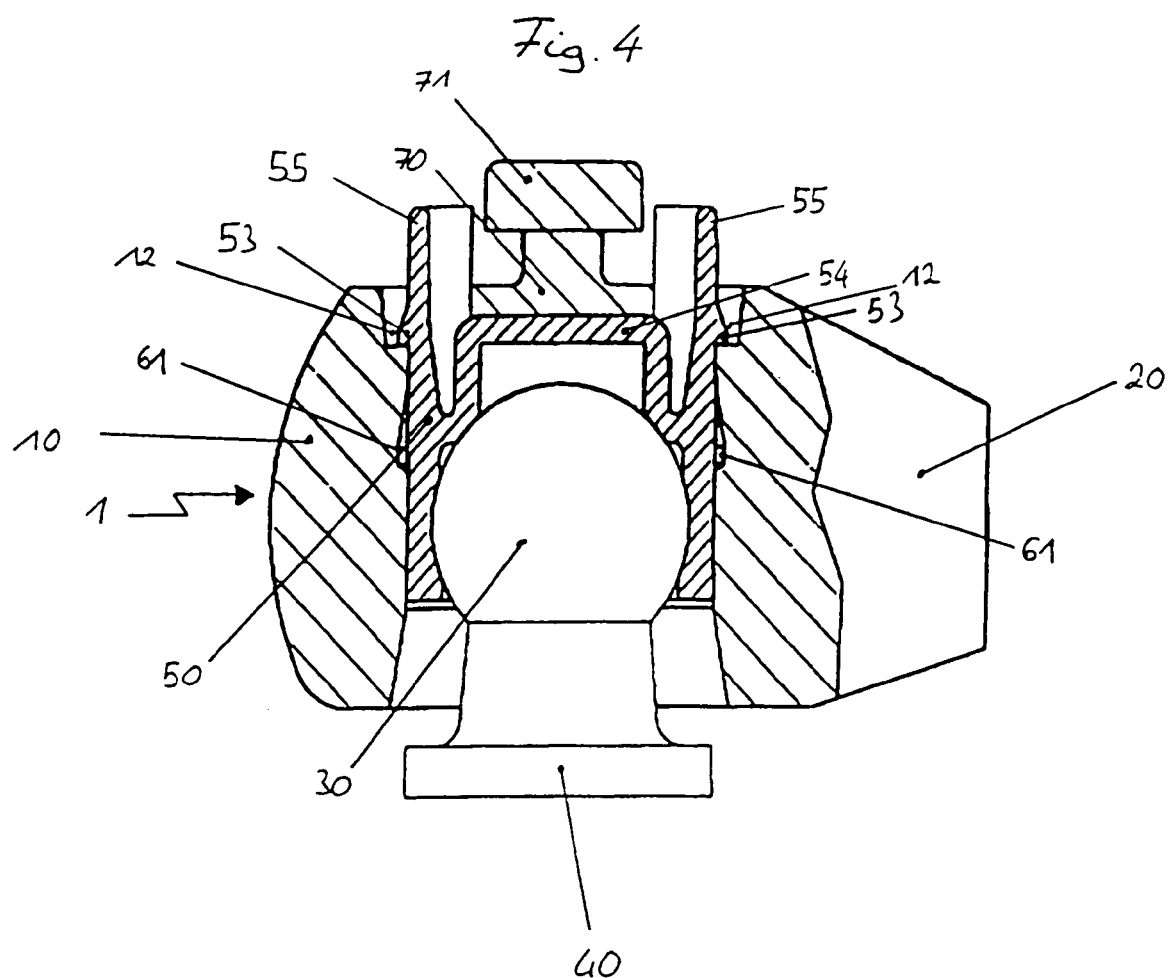

CONNECTING ELEMENT

This application is a continuation of U.S. patent application Ser. No. 09/980,537 filed Feb. 26, 2002, now abandoned which is hereby incorporated herein by reference in its entirety.

1. TECHNICAL FIELD

The present invention relates to a connecting element for the releasable connection of a first part to a second part, in particular a Bowden cable to a lever.

2. PRIOR ART

In many fields of mechanical engineering there is the problem to interconnect two parts. An important case is the connection between a lever and a Bowden cable, for example when the movements of a shift lever are to be transmitted via a Bowden cable to the gear box of a vehicle or when a parking brake is to be operated by means of a braking lever via two braking cables. Thus, such a connection is in particular used in the automotive field, but also in construction machines or sport equipment a plurality of connections between separate components of a machine or the device are needed.

Such a device has to meet different requirements. On the one hand it should be reliable and stable so that the parts do not become unintentionally disconnected during their use (operation of a vehicle, movement of a construction machine, etc.) On the other hand, the connection should for cost reasons be designed such that the parts can during assembly easily and without excessive force be manually assembled. Connections with screws or the like are therefore excluded from the beginning.

In the prior art constructions are well-known, where the maximum mechanical loading on the connection exceeds the necessary force during assembly many times. These arrangements consist typically of a sphere-like head attached to the first part which is snapped into a dome shaped receptacle attached to the second part, whereby the sides of the dome shaped receptacle are bent. In order to provide a lasting latching of this connection, the dome shaped receptacle moves on a slide or the like together with the sphere-like head into an opening or recess of the second part whose walls avoid a bending of the sides of the dome shaped receptacle. When the slide is latched at the end of the sliding motion, the simple movement of the sphere-like head in the direction of the dome shaped receptacle not only provided the actual connection between the two parts but also the automatic latching of the connection, which is therefore capable to resist mechanical loading exceeding many times over the force required for assembly.

In many cases, however, the connection also has to be easily releasable. In case of the mentioned examples from the automotive field it is for example during repairs necessary to replace the Bowden cables and to separate them from the shift lever or braking lever. The connections used in the prior art are either (without destruction) not releasable at all or they require complicated special tools in order to release the slide or the like from its latched position so that the dome shaped receptacle can be moved back into its starting position and the sphere-like head can be removed therefrom.

A further disadvantage of connections of the described type is the fact that the stable connection between the sphere-like head and the dome shaped receptacle is directly transmitting vibrations from one part to the other part. This is in many cases a disadvantage, in particular for the above mentioned connection between a shift lever and a Bowden cable, since the vibrations transmitted from the motor on the cable can thus be felt in the shift lever which renders precise shifting movements more difficult.

It is therefore the problem of the present invention to provide a simple and inexpensive connection between two parts which provides on the one hand a high mechanical stability with an easy assembly but which can also easily manually be released.

According to a further aspect of the present invention, the connection is to damp the transmission of vibrations between the two parts.

3. SUMMARY OF THE INVENTION

The invention relates to a connecting element for the releasable connection of a first part to a second part, in particular a cable to a lever, wherein the connecting element comprises a housing rigidly attached to the first part, an engaging element attached to the second part and a slide with a receiving element complementary shaped to the engaging element for the releasable connection of the engaging element with the receiving element, wherein the slide can slide inside the housing from a first position into a second position for latching the releasable connection between the engaging element and the receiving element. The connecting element further comprises at least one latching means for fixing the slide in the second position and at least one releasing means which serves for manually acting onto the at least one latching means to release the slide from the second position for unlatching the releasable connection between the engaging element and the receiving element.

By the at least one releasing means, which is integrally connected with the connecting element, the slide can with a simple movement of the hand be released from its latched position, in order to separate the two parts from each other. Special tools or special technical skills are not necessary. Thus, it is for example in case of the use in the automotive field also for a non-skilled person possible to perform repairs which need a disassembly of the connected parts. However, the high mechanical stability of the connection remains unaffected.

Preferably, two snapping hooks are provided as the at least one latching means. The at least one releasing means is preferably provided as extensions of the two snapping hooks extending over the edge of the housing. In this preferred embodiment of the invention the slide is released from its latched position simply by manually pressing the extensions together. Since the force for pressing attacks at the end of the extensions, an easy release is due to the lever principle also possible in case of a stable latching.

According to a particularly preferred embodiment, the slide slides along a bushing extending through the housing. This bushing allows by a suitable material selection an optimization of the sliding properties of the slide and facilitates thus the assembly of the two parts. Preferably, the bushing is apart from one or more slits for the release means closed by a cover on the side opposite to the receiving element.

A damping element for damping the transmission of vibrations between the two parts is preferably provided inside the housing. Preferably, the damping element is arranged between the bushing and the housing. Thus, the vibrational damping does not affect the stability of the connection between the engaging element and the slide.

Preferably, the bushing has lateral projections or edges coacting with recesses of the damping element for its fixing.

Further advantageous developments of the present invention are the subject matter of the depending claims.

SHORT DESCRIPTION OF THE DRAWING

Figure 2:
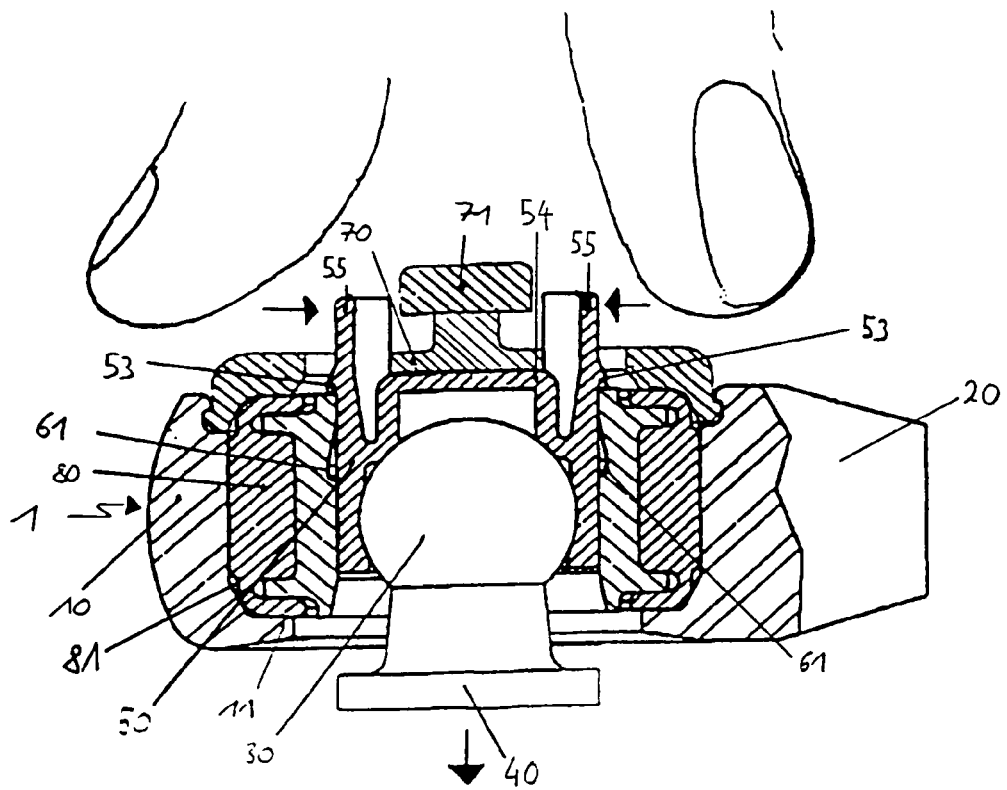
Figure 3:
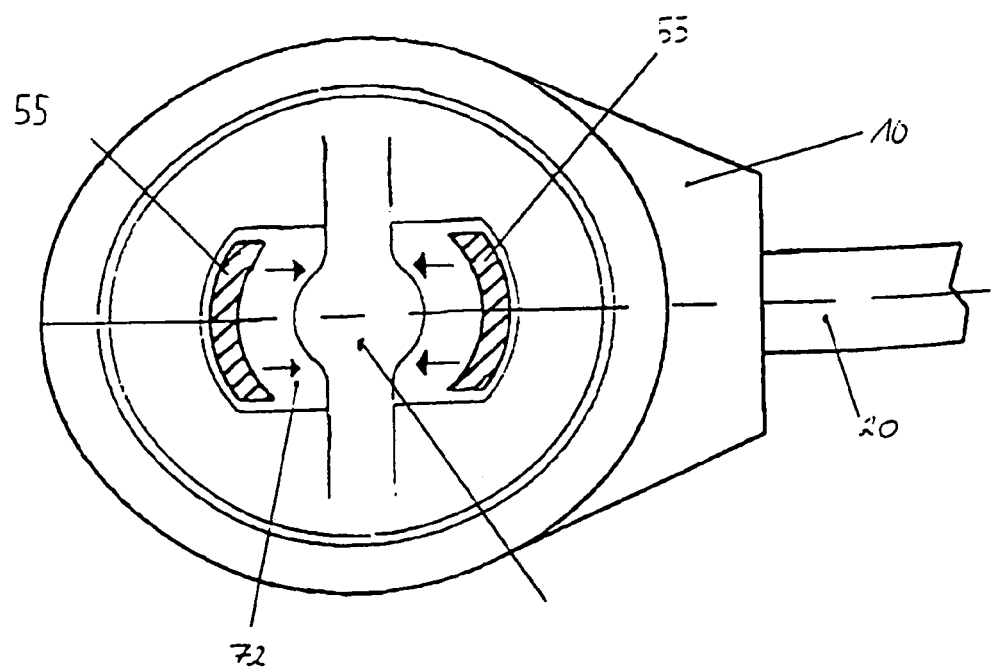

In the following detailed description presently preferred embodiments of the present invention are described with reference to the figures, which show:

FIG. 1: A cross-section through a first preferred embodiment of the connecting element according to the invention immediately before the two parts are assembled;

FIG. 2: the same cross-section as in FIG. 1 through the first preferred embodiment in the latched state;

FIG. 3: a top view of the preferred embodiment of the FIGS. 1 and 2;

FIG. 4: a cross-section through a further preferred embodiment without vibrational damping.

5. DETAILED DESCRIPTION OF THE INVENTION

With reference to FIG. 1 the connecting element 1 comprises a housing 10, which is mounted to a first part 20. For connecting, an engaging element 30, which is mounted to a second part 40, is inserted into the housing 10 (see the lower vertical arrow in FIG. 1). The two parts 20 and 40, of which in FIG. 1 only the corresponding ends to be connected are schematically shown, can be any arbitrary mechanical elements, for example a bar or the end of a Bowden cable etc. In the preferred embodiment of the connecting element 1, shown in FIG. 1, an essentially rectangular connection is produced. With a correspondingly modified housing 10 also a straight interconnection is possible, as well as any other angle. This is without any importance for the mechanism of the connecting element 1 according to the invention described in the following.

The preferably sphere or egg shaped engaging element 30 snaps under a movement in the direction of the arrow (cf. FIG. 1) into the preferably dome shaped receiving element 51, arranged at the lower end of a slide 50. The sides of the receiving element 51 are preferably provided with openings 52 which allow a lateral bending of the receiving element 51 to facilitate the connecting and releasing of the engaging element 30 with or from the receiving element 51. The slide 50 is preferably slideably arranged within a bushing 60 and preferably preliminary fixed by lateral snapping hooks 53 which engage corresponding recesses 61 of the bushing 60. Under a further movement of the engaging element in the direction of the arrow, the complete slide 50 slides from its starting position upwards inside the bushing 60 (cf. upper vertical arrow in FIG. 1), until an intermediate support 55 of the slide 50 contacts the lower side of a cover 70 (cf. FIG. 2) which closes the housing on its upper side. Also other limitations for the sliding movement are possible, for example a stopper inside the bushing 60.

The preferred cover 70 protects the connecting mechanism against the accumulation of dirt and against damages. Furthermore, a holding and/or support surface 71 is provided on the upper side of the cover 70 for supporting the complete connecting element 1 when the engaging element 30 is being inserted (cf. the indicated finger in FIG. 1). In the preferred embodiment shown in FIGS. 1 to 3. the cover 70 is clipped onto the housing 10. Other ways of mounting are also possible.

In the above position the snapping hooks 53 engage preferably the edge of the bushing 60 (cf. FIG. 2) and thus fix the slide 50 against an axial movement in the direction of the downwards pointing arrow in FIG. 2. Conceivable is also an embodiment, where the snapping hooks 53 engage additional upper recesses (not shown) of a correspondingly elongated bushing 60.

When the slide 50 slides upwards, the sides of the receiving element 51 are automatically compressed by the bushing 60 so that the sphere-like or egg-like engaging element 30 is rigidly fixed within the receiving element 51. As a result, the upward movement of the connector 51 provides a connection between the first part 20 and the second part 50 which is capable to resist high mechanical loading.

As can be seen from FIG. 2, preferably two releasing means 55 are provided for releasing the connection of the two parts 20, 40 which are preferably provided as extensions of the two snapping hooks 53. When the slide is in the upper latched position, these two extensions 55 extend preferably through an opening 72 (cf. FIG. 3) in the cover 70 over the edge of the housing 10. Thus, it is by means of a simple pressing of the two extensions 55 (cf. horizontal arrows in FIGS. 2 and 3) possible to release the slide 50 from its latched position, so that it can slide downwards with a downwardly directed pulling on the first part 20 (cf. vertical arrow in FIG. 2) and the dome shaped receiving element 51 can release the engaging element 30. The connecting element 1 is then once again in the starting position shown in FIG. 1.

In order to allow an easy manual release of the slide 50 from its latched position even with very stiff snapping hooks 53, the releasing means 55 might be longer than shown in FIGS. 1 and 2. The stiffness of the snapping hooks 53, which is essential for the maximum mechanical loading, of the connection is determined by the flexibility and material thickness of the sidewalls of the slide 50.

Further to the above discussed embodiment, where the releasing means 55 are provided as extensions of the snapping hooks 53 it is also possible to separately provide them on the housing 10 and to have them act onto the snapping hooks 53 by a rotational or a sliding movement etc. to release the slide 50 from its latched position.

In the embodiment shown in FIGS. 1 to 3 of the connecting element 1 according to the invention, vibrations are damped additionally to the already described functions. To this end, a flexible damping element is preferably arranged between the bushing 60 in which the slide 50 slides and the housing 10. Vibrations of the housing 10 are therefore only to a limited extent transmitted to the bushing 60 and thus to the engaging element 30 on which the second part 40 is attached.

Preferably, the damping element 80 is arranged between a lower projecting edge 11 of the housing 10 and the already above mentioned cover 17 at the upper edge of the housing 10. Thus, a direct mechanical contact between the housing 10 and the bushing 60 is effectively avoided. For a fixing of the bushing 60 relative to the damping element 80 it comprises on the upper and the lower side lateral projections or edges 62 engaging corresponding recesses 81 of the damping element 80.

FIG. 4 shows a simplified embodiment of the present invention without a vibrational damping. In this case the slide 50 slides directly along an opening inside the housing 10. The recesses 61 for the preliminary fixing of the slide 50 in the first position are as well as additional recesses 12 for the upper position directly provided in the housing 10.

Further, the cover 70 is in this embodiment preferably an integral part of the housing 10 (cf. the hatching in FIG. 4).

The described connecting element is preferably made of plastic materials or metals. Metals have a greater stability, whereas plastic materials, as for example Polyamide, are less expensive to produce, for example with injection molding. For the damping element 80 preferably typical Elastomers are used. For the selection of the materials for the slide 50 and the bushing 60 or the housing 10, respectively, it should be taken care that good sliding properties are achieved in order to provide an easy connecting of the two parts.

The invention claimed is:

1. A connecting element for releasably connecting a first part with a second part, comprising:
   a) a housing which is rigidly attached to the first part;
   b) an engaging element attached to the second part;
   c) a slide with a receiving element complementary shaped to the engaging element for releasable connection of the engaging element with the receiving element, the slide being slidable inside the housing from a first position to a second position for latching together the engaging element and the receiving element;
   d) at least one latch for fixing the slide in the second position;
   e) at least one release member extending outwardly of the housing for manually acting onto the at least one latch to release the slide from the second position for unlatching the releasable connection between the engaging element and the receiving element in order to separate the two parts from each other; and
      wherein the slide slides along a bushing extending through the housing; and the bushing is covered by a cover on the side opposite to the engaging element and the cover has one or more openings for the at least one release member.

2. A connecting element according to claim 1, wherein on the outer side of the cover a holding and/or support surface is arranged for facilitating the connecting of the two parts.

3. A connecting element according to claim 1, wherein a damping element for damping the transmission of vibrations between the two parts is provided inside the housing.

4. A connecting element according to claim 3, wherein the damping element is arranged between a bushing and the housing.

5. A connecting element for releasably connecting a first part with a second part, comprising:
   a) a housing which is rigidly attached to the first part;
   b) an engaging element attached to the second part;
   c) a slide with a receiving element complementary shaped to the engaging element for releasable connection of the engaging element with the receiving element, the slide being slidable inside the housing from a first position to a second position for latching together the engaging element and the receiving element;
   d) at least one latch for fixing the slide in the second position;
   e) at least one release member extending outwardly of the housing for manually acting onto the at least one latch to release the slide from the second position for unlatching the releasable connection between the engaging element and the receiving element in order to separate the two parts from each other;
      wherein a damping element for damping the transmission of vibrations between the two parts is provided inside the housing;
      wherein the damping element is arranged between a bushing and the housing; and
      wherein the bushing comprises lateral projections or edges coacting for its fixing with recesses of the damping element.

6. A connecting element for releasably connecting a first part with a second part, comprising:
   a) a housing;
   b) an engaging element;
   c) a slide with a receiving element complementary shaped to the engaging element for releasable connection of the engaging element with the receiving element, the slide being slidable inside the housing from a first position to a second position for latching together the engaging element and the receiving element;
   d) at least one latch for fixing the slide in the second position; and
   e) at least one release member extending outwardly of the housing for manually acting onto the at least one latch to release the slide from the second position for unlatching the releasable connection between the engaging element and the receiving element in order to separate the engaging element and housing;
      wherein a damping element for damping the transmission of vibrations is provided inside the housing;
      wherein the damping element is arranged between a bushing and the housing; and
      wherein the bushing comprises lateral projections or edges coacting for its fixing with recesses of the damping element.

7. A connecting element for releasably connecting a first part with a second part, comprising:
   a) a housing;
   b) an engaging element;
   c) a slide with a receiving element complementary shaped to the engaging element for releasable connection of the engaging element with the receiving element, the slide being slidable inside the housing from a first position to a second position for latching together the engaging element and the receiving element;
   d) at least one latch for fixing the slide in the second position;
   e) at least one release member extending outwardly of the housing for manually acting onto the at least one latch to release the slide from the second position for unlatching the releasable connection between the engaging element and the receiving element in order to separate the engaging element and housing; and
      wherein the slide slides along a bushing extending through the housing; and the bushing is covered by a cover on the side opposite to the engaging element and the cover has one or more openings for the at least one release member.

8. A connecting element according to claim 7, wherein on the outer side of the cover a holding and/or support surface is arranged for facilitating the connecting of the engaging element and housing.

9. A connecting element according to claim 7, wherein a damping element for damping the transmission of vibrations is provided inside the housing.

10. A connecting element according to claim 9, wherein the damping element is arranged between a bushing and the housing.

11. A connecting element for releasably connecting a first part with a second part, comprising:
    a) a housing;
    b) an engaging element;

c) a slide with a receiving element complementary shaped to the engaging element for releasable connection of the engaging element with the receiving element, the slide being slidable inside the housing from a first position to a second position, the engaging element being connected with the receiving element in the first position;

d) at least one latch for fixing the slide in a first recess inside the housing in the first portion and for fixing the slide in an additional recess inside the housing in the second position;

e) at least one release member extending outwardly of the housing for manually acting onto the at least one latch to release the slide from the second position for unlatching the releasable connection between the engaging element and the receiving element in order to separate the engaging element and housing; and wherein the housing is covered by a cover on the side opposite to the engaging element and the cover has one or more openings for the at least one release member.

12. A connecting element according to claim 11, wherein the at least one latch includes two snapping hooks and the at least one release member includes at least one release lever.

13. A connecting element according to claim 12, wherein the at least one release lever is provided as two extensions of the two snapping hooks extending over the edge of the housing.

* * * * *